(12) United States Patent
Takla et al.

(10) Patent No.: US 9,731,392 B2
(45) Date of Patent: Aug. 15, 2017

(54) ROBOTIC TOOL CHANGER ALIGNMENT MODULES

(71) Applicant: ATI Industrial Automation, Inc., Apex, NC (US)

(72) Inventors: Alfred Atef Takla, Durham, NC (US); William G. Berrocal, Holly Springs, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 462 days.

(21) Appl. No.: 14/451,997

(22) Filed: Aug. 5, 2014

(65) Prior Publication Data

US 2016/0039059 A1 Feb. 11, 2016

(51) Int. Cl.
| | | |
|---|---|---|
| *G06F 19/00* | (2011.01) | |
| *B23Q 3/155* | (2006.01) | |
| *B23Q 3/18* | (2006.01) | |
| *B25J 9/16* | (2006.01) | |

(52) U.S. Cl.
CPC ......... *B23Q 3/15506* (2013.01); *B23Q 3/186* (2013.01); *B25J 9/1692* (2013.01); *G05B 2219/50141* (2013.01); *G05B 2219/50264* (2013.01); *G05B 2219/50291* (2013.01)

(58) Field of Classification Search
None
See application file for complete search history.

(56) References Cited

U.S. PATENT DOCUMENTS

| | | | | |
|---|---|---|---|---|
| 4,562,391 | A * | 12/1985 | Inoue | B25J 9/046 219/124.1 |
| 5,870,834 | A * | 2/1999 | Sheldon | G01B 5/004 33/502 |
| 6,307,211 | B1 * | 10/2001 | Beckhart | H01L 21/681 250/559.33 |
| 2001/0025183 | A1 * | 9/2001 | Shahidi | A61B 90/10 606/130 |
| 2003/0108395 | A1 * | 6/2003 | Douglas | B23Q 9/02 408/76 |
| 2006/0137988 | A1 * | 6/2006 | Yahashi | H01J 37/32642 205/82 |
| 2007/0055144 | A1 * | 3/2007 | Neustadter | A61N 5/1049 600/425 |
| 2007/0173975 | A1 * | 7/2007 | Schena | A61B 34/70 700/245 |
| 2009/0025463 | A1 * | 1/2009 | McFarland | G01B 21/045 73/104 |

(Continued)

*Primary Examiner* — Adam Lee
(74) *Attorney, Agent, or Firm* — Coats & Bennett, PLLC

(57) ABSTRACT

Alignment modules attached to a robotic tool changer assist spatial orientation and alignment of a robot arm relative to a robotic tool for location training. A three-axis spatial orientation sensor is first attached to an alignment module affixed to a tool unit. The sensor is "zeroed," or calibrated to the spatial orientation of the tool unit. The sensor is transferred to a corresponding surface of an alignment module affixed to a master unit. The orientation of the robot arm is adjusted to eliminate sensor error signals indicating deviations from the zeroed orientation of the tool unit. An optical signal, such as a cross line laser beam, is then projected between the alignment modules. The x- and y-axis position of the robot arm is adjusted to align the optical signal with alignment markings. When the master and tool units are aligned, the robot arm is advanced in the z-axis direction until the master unit abuts the tool unit.

22 Claims, 2 Drawing Sheets

(56) References Cited

U.S. PATENT DOCUMENTS

| | | | | |
|---|---|---|---|---|
| 2009/0204261 | A1* | 8/2009 | Strand | B25J 9/1656 700/264 |
| 2009/0287450 | A1* | 11/2009 | Dubois | G01B 11/2518 702/152 |
| 2009/0299688 | A1* | 12/2009 | Kohler | B25J 9/1692 702/152 |
| 2011/0129320 | A1* | 6/2011 | Duchaine | B25J 13/085 414/1 |
| 2011/0317879 | A1* | 12/2011 | Demopoulos | B25J 9/1692 382/106 |
| 2011/0320153 | A1* | 12/2011 | Lightcap | G01C 21/16 702/94 |
| 2012/0283747 | A1* | 11/2012 | Popovic | A61B 34/37 606/130 |
| 2013/0053997 | A1* | 2/2013 | Ohashi | H01J 21/67742 700/103 |
| 2013/0199010 | A1* | 8/2013 | Osato | B23Q 1/00 29/283 |
| 2013/0325179 | A1* | 12/2013 | Liao | B25J 9/1692 700/254 |
| 2014/0005829 | A1* | 1/2014 | Chhatpar | B25J 9/1692 700/254 |
| 2014/0067124 | A1* | 3/2014 | Williamson | G05B 19/406 700/258 |
| 2014/0172166 | A1* | 6/2014 | Kim | B25J 3/04 700/259 |
| 2014/0173870 | A1* | 6/2014 | Otts | B25J 9/1692 29/407.1 |
| 2015/0241203 | A1* | 8/2015 | Jordil | B25J 9/1623 356/4.01 |
| 2015/0330760 | A1* | 11/2015 | Siercks | G01B 7/008 33/503 |
| 2016/0113728 | A1* | 4/2016 | Piron | A61B 17/3421 606/130 |

* cited by examiner

ROBOTIC TOOL CHANGER ALIGNMENT MODULES

FIELD OF INVENTION

The present invention relates generally to robotic tool changers, and in particular to an alignment module for a tool changer that aids in teaching a robot controller the locations at which to couple/decouple robotic tools.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot arm to accomplish a variety of tasks. For example, in an automotive manufacturing application, a robot arm may be utilized to cut, grind, or otherwise shape metal parts during one phase of production, and perform a variety of welding tasks in another. Different welding tool geometries may be advantageously mated to a particular robot arm to perform welding tasks at different locations or in different orientations.

In these applications, a tool changer is used to mate different tools to the robot. One half of the tool changer, called the master unit, is permanently affixed to a robot arm. The other half, called the tool unit, is affixed to each tool that the robot may utilize. When the robot arm positions the master unit adjacent a tool unit connected to a desired tool, a coupler is actuated that mechanically locks the master and tool units together, thus affixing the tool to the end of the robot arm. Operation of the robot arm, as well as many peripheral devices such as the master unit of a tool changer, is controlled by software executing on a robot controller. The robot controller may receive inputs from a variety of sensors (force, pressure, temperature, optical, etc.).

Robotic tools may require utilities, such as electrical current, air pressure, hydraulic fluid, cooling water, electronic or optical data signals, and the like, for operation. Connections to these utilities may be unwieldy, or even unsafe, in operation. Additionally, if two or more tools require the same utilities, a dedicated connection to each tool would be duplicative. Accordingly, one important function of a robotic tool changer is to provide utility-passing modules. Such modules may be attached to standardized locations on the master and tool units of the robotic tool changer. The modules include mating terminals, valve connections, electrical connectors, and the like, making the utilities available to the selected tool when it is coupled to the robot arm. Many tool changers include one or more standard-sized "ledges" about their periphery, to which various utility-passing modules may be attached, as required. Tool changers and utility-passing modules are well known in the robotics arts, and are commercially available, such as from the assignee, ATI Industrial Automation of Apex, N.C.

When not in use, robotic tools are stored in a special rack, or tool holder, within the operative range of the robotic arm. Robot arm controller software "remembers" where each tool is, and each tool is returned to precisely the same position in its tool holder prior to the tool changer decoupling. Similarly, the robot arm controller software "knows" precisely where the next desired tool is stored, and it positions the master unit of the tool changer (on the robot arm) adjacent the tool unit (on the desired tool), then actuates the tool changer to couple the tool to the robot arm.

Many tool changers include location features, such as conical pins protruding from the master unit and corresponding tapered holes in the tool unit, to ensure the master and tool units assume the proper relative geometry as they are coupled together. However, ideally these features should not be relied on for alignment, as they require the robot arm to shift or rotate the tool in its tool holder as the master and tool units of the tool changer align. Rather, the robot arm should ideally adjust its spatial orientation and its position to precisely align with the tool residing in the tool holder, so that the master and tool units of the tool changer are already in alignment as they are brought together for coupling.

When initially setting up a control program, such as for a production run, the robot controller must be "taught" where each tool resides in storage. This information includes not only the tool's location, but its spatial orientation, which the robot arm must match to ensure a proper coupling by the tool changer.

One known method of training a robot controller regarding tool location is to attach plates, called teaching aids, to the master and tool units of the tool changer. For example, one of the teaching aid plates presents a mechanical interface to the master unit that mimics the tool unit, and includes the tapered holes to receive the conical location pins protruding from the master unit. When the teaching aid plate is abutted to the master unit, the tool changer coupling mechanism is actuated to couple the teaching aid to the master unit, as if it were a tool unit. Similarly, a teaching aid plate, e.g., having conical location pins to mimic the master unit, is placed over the tool unit, and may be held in place by magnets or the like. Alignment marks are etched into or painted onto the sides of the teaching aids.

To train the robot controller software of a tool location, a technician positions the robot arm to an approximate position near the tool, such as by using a joystick or other user interface to the robot controller. As the robot arm is moved forward to bring the two teaching plates together, the position of the robot arm is manually adjusted, in small increments, to bring the alignment marks on the two teaching aids together. The alignment marks on all sides of the teaching aids should be precisely aligned as the robot arm is moved to abut the teaching aid plates together. The spatial orientation and position of the robot arm at this point—after adjusting the z-axis position to account for the thickness of the teaching aid plates—is then stored as the location to attach and detach the tool. This process is repeated for each tool the robot arm will utilize during the production run.

The teaching aid plate method of training a robot arm regarding the position of robotic tools has several disadvantages. The accuracy of alignment between master and tool units is limited by human visual perception, which is limited and highly inconsistent from person to person and from day to day. In cases of misalignment, it may be difficult to ascertain whether the alignment is simply in the x-y plane, or whether the robot arm is rotated, canted, or otherwise not in the same spatial orientation as the tool. In the case of large tool changers designed to handle very heavy tools, the master and tool units may include multiple mechanical coupling mechanisms. Providing teaching aid plates for each of these, and attempting to simultaneously align multiple teaching aid plates, is impractical. Finally, even when satisfactory alignment is achieved, a correction in the z-axis position is required, to account for the thickness of the teaching aid plates.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, both spatial orientation and precise alignment of a robot arm relative to a robotic tool are quickly and easily achieved through the combined use of a three-axis spatial orientation sensor and an optical position indicator. In one embodiment, a sensor such as an Inertial Measurement Unit (IMU) is first attached to a surface of an alignment module affixed to the tool unit of the tool changer. The sensor is "zeroed," or calibrated to the spatial orientation of the tool unit. The sensor is then transferred to a corresponding surface of an alignment module affixed to the master unit. The sensor outputs error signals indicating any deviations from the three-axis orientation of the tool unit. The orientation of the robot arm is adjusted to eliminate these error signals, resulting in the master unit having the same spatial orientation as the tool unit, although probably offset from a coupling axis centered on the tool unit. An optical indicator is then activated to project an optical signal, such as a cross line laser beam, between the alignment modules. The x- and y-axis position of the robot arm is then adjusted (maintaining the spatial orientation) to align the optical signal with alignment markings. When the master and tool units are thus aligned, the robot arm is advanced in the z-axis direction until the master unit abuts the tool unit. This orientation and position is recorded as the location to attach and detach the relevant tool. This process may then be repeated for each tool to be located.

One embodiment relates to a method of aligning a robot arm with a robotic tool, wherein a master unit of a tool changer is affixed to the robot arm and a tool unit of the tool changer is affixed to the robotic tool. The spatial orientation of the tool unit, along three orthogonal axes, is sensed. An orientation of the robot arm is adjusted to align the master unit to the sensed spatial orientation of the tool unit with respect to the three axes. One or more optical indicators are projected from one of the master and tool units to the other. The position of the robot arm is adjusted in two orthogonal directions transverse to a coupling axis centered on the tool unit, in response to the optical indicators, so as to center the master unit on the coupling axis. The robot arm is moved along the coupling axis until the master unit contacts the tool unit.

Another embodiment relates to a robotic tool changer. The tool changer includes a master unit operative to be affixed to one of a robot arm and a robotic tool, and a tool unit operative to be affixed to the other of the robot arm and the robotic tool. A first alignment module is affixed to a ledge of one of the master and tool units; the first alignment module includes an optical source. A second alignment module is affixed to a corresponding ledge of the other of the master and tool units; the second alignment module includes one or more optical targets on a surface facing the first alignment module. A spatial orientation sensor is operative to be attached to corresponding surfaces of both the first and second alignment modules. The sensor is operative to sense the spatial orientation, along three orthogonal axes, of the alignment module to which it is attached.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. Orientation of the elements in the drawings is consistent. Accordingly, terms of reference such as up, down, left, right, vertical, horizontal, and the like, which are used herein for clarity of expression, apply only to the orientation of elements in the drawings and are hence relative, and not absolute, directions. Naturally, in use, the elements depicted in the drawings may assume any orientation or be viewed from a different perspective.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
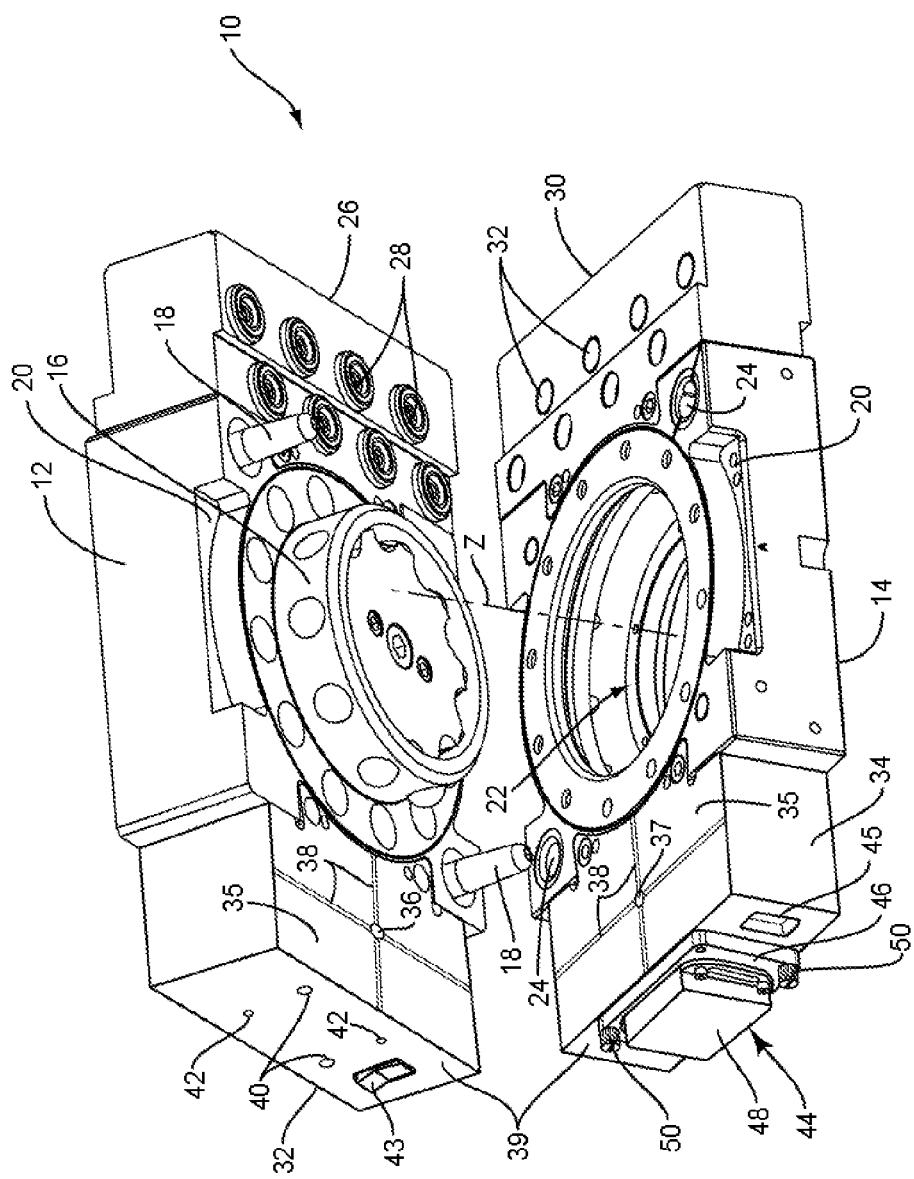
FIG. 1 is a perspective view of a tool changer with alignment modules attached.

FIG. 1 depicts a robotic tool changer 10. The tool changer 10 comprises a master unit 12 operative to be affixed to a robot arm (not shown), and a tool unit 14 operative to be affixed to a robotic tool (not shown). The master unit 12 includes a coupling mechanism 16, conical alignment pins 18, and a ledge 20 formed on each of four sides for the attachment of utility-passing modules. The tool unit 14 includes a recess 22 to accept the coupling mechanism 16, and tapered alignment holes 24 to accept alignment pins 18. The tool unit 14 also includes a ledge 20 formed on each of four sides for the attachment of utility-passing modules. A coupling axis, labeled "z" in FIG. 1, extends through, and is centered on, the tool unit 14.

The coupling mechanism 16, in the embodiment pictured, operates by projecting balls radially outward through concentrically spaced holes. The balls contact and are urged against an annular surface within the recess 22 in the tool unit 14, thus coupling the master unit 12 and tool unit 14 together. However, the particular coupling mechanism is not germane to a discussion of embodiments of the present invention, and could, in other embodiments, comprise any of a variety of designs.

FIG. 1 depicts a pneumatic fluid supply module 26 attached to the master unit 12, and a corresponding pneumatic fluid receiver module 30 attached to the tool unit 14, as a representative example of a utility-passing module. A plurality of self-sealing pneumatic ports 28 provides pneumatic fluid to corresponding ports 32 when the master unit 12 is coupled to the tool unit 14. As well known in the art, other utility-passing modules—for example, providing high electrical current, electrical or optical data signals, or the like, may be attached to the tool changer 10. The ledges 20 formed in all four sides of the master unit 12 and tool unit 14 provide a standard mechanical mount point for the attachment of utility-passing modules 26, 30.

According to embodiments of the present invention, a first alignment module 32 is attached to an available ledge 20 of the master unit 12, and a second alignment module 34 is attached to an available ledge 20 of the tool unit 14. The alignment modules 32, 34 facilitate the alignment of a robot arm and a tool when training the robot controller regarding tool location. In one embodiment, the first alignment module 32 and second alignment module 34 comprise identical housings. This provides economies of scale in manufacturing and inventory control, and ensures complete alignment of features of the modules, as described herein.

A surface 35 of each module 32, 34, oriented to face a corresponding surface 35 on the other module 32, 34, includes perpendicular grooves 38 and a small, round hole 37 at the intersection of the grooves 38. Similarly, a surface 39 of the modules 32, 34 includes a larger, rectangular hole 45. An optical source 36, such as a diode laser, is disposed in the hole 37 on the first alignment module 32, and a switch 43 is disposed in the hole 45. The switch 43 selectively couples the laser 36 to an appropriate power source (not shown) such as, in one embodiment, three AAA batteries. In one embodiment, when energized, the laser 36 projects a cross line laser beam comprising two perpendicular lines. The laser 36 is disposed in the hole 37 and aligned such that the cross lines of the laser beam are aligned with the grooves 38. Various occupational safety regulations may limit the wavelength and power of laser 36 that may be used. One example of a suitable optical source 36 is the Infiniter VLM-650-29 series Cross Line Laser available from Quarton, Inc. in Taiwan.

A spatial orientation sensor assembly 44 may be mounted to another surface 39 of either the first or second alignment module 32, 34. To facilitate mounting the sensor assembly 44, and to ensure that it consistently assumes the same relative orientation to the module 32, 34, two threaded holes 40 and two detents 42 are formed in the surfaces 39. These accept, respectively, hand-actuated fasteners 50 through, and dowel pins (not shown) on the underside of, a mounting plate 46. A three-axis spatial orientation sensor 48 is mounted to the mounting plate 46. The spatial orientation sensor 48 may comprise an Inertial Measurement Unit (IMU), which may comprise solid-state or microelectromechanical systems (MEMS) gyroscopes, accelerometers, and/or magnetometers on three orthogonal axes. The spatial orientation sensor 48 may further include a processing system that processes sensor data from the IMU and solves for attitude and heading, known in the art as an Attitude and Heading Reference System (AHRS). The sensor 48 includes a command and data output interface. The interface may comprise a wired interface, such as a Universal Serial Bus (USB) port, and/or a wireless interface, such as an IEEE 802.11x (Wi-Fi), Bluetooth®, or the like. The spatial orientation sensor 48 may communicate with a portable device carried by a technician, such as a smartphone or tablet/laptop computer, or may communicate directly with a robot controller. A suitable spatial orientation sensor 48 is the YEI 3-Space Sensor™ available from YEI Technology of Portsmouth, Ohio.

In one embodiment, the first and second alignment modules 32, 34 comprise identical housings, with the perpendicular grooves 38 formed in a facing surface 35, and a hole 37 at the intersection of the grooves 38. The first and second alignment modules 32, 34 are distinguished only by the fact that an optical source 36 is mounted in the hole 37 in the first alignment module 32. Both the first and second alignment modules 32, 34 include mounting features, such as two threaded holes 40 and two detents 42, formed in corresponding surfaces 39, for the attachment of a spatial orientation sensor assembly 44.

In operation, the first alignment module 32 is attached to either the master unit 12 (as depicted in FIG. 1) or tool unit 14 of a tool changer 10, and the second alignment module 34 is attached to the other of the master and tool unit 12, 14. Because the ledges 20 of the master unit 12 and tool unit 14 are aligned, and the first and second alignment modules 32, 34 comprise the identical housings, the perpendicular grooves 38 in the respective surfaces 35 are aligned with each other when the master and tool units 12, 14 are coupled together, or when they are spaced apart along the z-axis but are otherwise aligned. Furthermore, the surfaces 39, on which the spatial orientation sensor assembly 44 may be mounted, are co-planar when the master unit 12 and tool unit 14 are coupled together.

Figure 2:
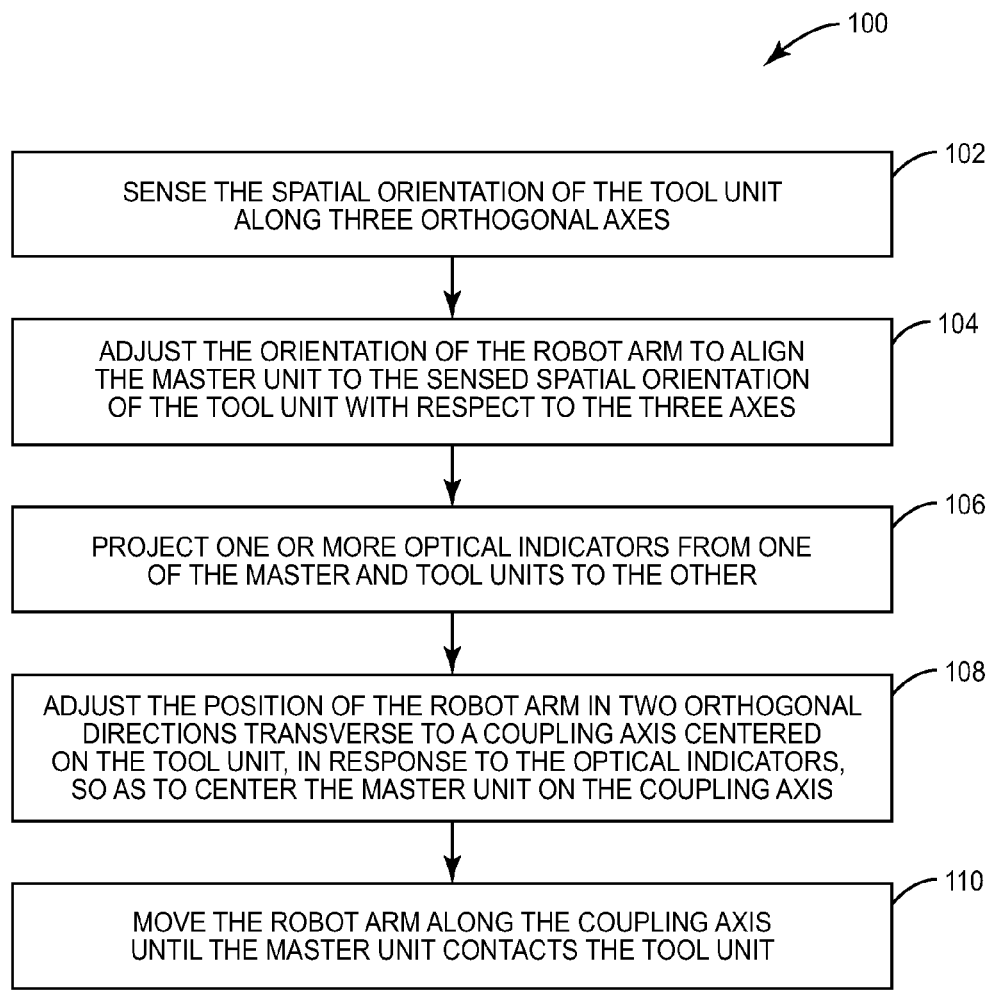
FIG. 2 is a flow diagram of a method of aligning a robot arm with a robotic tool, wherein a master unit of a tool changer is affixed to the robot arm and a tool unit of the tool changer is affixed to the robotic tool.

Initially, as depicted for example in FIG. 1, the master unit 12, attached to a robot arm (not shown), and the tool unit 14, attached to a robotic tool (not shown), do not have the same spatial orientation, and are not aligned along the z-axis. FIG. 2 depicts the steps of a method 100 of aligning a robot arm with a robotic tool.

First, the spatial orientation of the tool unit is sensed along three orthogonal axes (block 102). To accomplish this, the spatial orientation sensor assembly 44 is mounted to the surface 39 of the second alignment module 34 (attached to the tool unit 14), as depicted in FIG. 1. The sensor 48 is powered up and "zeroed"—a calibration procedure in which the sensor outputs are set to zero for its current spatial orientation. Any change in the spatial orientation of the sensor 48 after the zero procedure will generate error signals along one or more axes.

Next, the orientation of the robot arm is adjusted to align the master unit 12 to the sensed spatial orientation of the tool unit 14, with respect to the three axes (block 104). To accomplish this, the spatial orientation sensor assembly 44 is removed from the second alignment module 34 and mounted on the corresponding surface 39 of the first alignment module 32. Since the master unit 12 is oriented differently than the tool unit 14, the spatial orientation sensor 48 will output an error signal with respect to one or more axes, indicating a sensed deviation from the orientation sensed during the "zero" procedure. A technician moves the robot arm, and hence the master unit 12 and first alignment module 32, to eliminate all error signals from the sensor 48, e.g., using a joystick or other robotic controller user interface. Alternatively, this task may be automated by interfacing the spatial orientation sensor 48 output to the robot controller and executing appropriate calibration software.

Once all error signals from the sensor 48 have been eliminated (or reduced below a predetermined threshold), the surface 39, and hence the first alignment module 32, and hence the master unit 12, has the same spatial orientation, with respect to the three axes, as the tool unit 14. However, the master unit 12 may not be aligned with the tool unit 14—that is, the master unit 12 may not be centered on the coupling axis (i.e., the z-axis of FIG. 1). To achieve such alignment, the robot arm may be moved in orthogonal x- and y-directions in a plane perpendicular to the z-axis. For convenience, in this embodiment, the x- and y-directions are defined to coincide with the directions of the alignment grooves 38 formed in the surfaces 35 of the alignment modules 32, 34.

To aid in achieving alignment, the optical source 36 is illuminated, such as by actuating the switch 43, to project one or more optical indicators from the first alignment module 32 to the second alignment module 34 (block 106). In one embodiment, as described above, a single diode laser projects a cross line laser beam. In other embodiments, a plurality of lasers may project conventional "dot" beams, with corresponding alignment markers on the second alignment module 34 surface 35, or any other form of optical indicator. In other embodiments, the optical indicator may be projected from the second alignment module 34 to the first alignment module 32.

A technician adjusts the position of the robot arm in two orthogonal directions transverse to the coupling (z) axis centered on the tool unit 14, in response to the optical indicators, so as to center the master unit 12 on the coupling axis (block 108). In the embodiment depicted in FIG. 1, the robot arm is adjusted in the x- and y-directions so as to align the cross lines of the laser beam in the grooves 38 on the facing surface 35. Assuming the laser 36 is properly aligned on the first alignment module 32, the cross lines of the laser beam will be parallel to the grooves 38. A deviation from parallel would indicate the master unit 12 is rotated with respect to the tool unit 14, which rotation should have been removed in the spatial orientation adjustment step of block 104. Accordingly, aligning the master and tool units 12, 14 on the coupling axis is a simple matter of moving the robot arm in x- and y-directions until the cross lines of the laser 36 coincide with the grooves 38. This task may similarly be automated, by providing optical sensors in or along the grooves 38 in the second alignment module 34, with the output of the optical sensors being provided to the robot controller software.

Following the spatial orientation adjustment and alignment steps, the robot arm is moved along the coupling (z) axis until the master unit 12 contacts the tool unit 14 (block 110). The master unit 12 should, at this point, be perfectly oriented and aligned with the tool unit 14, such that the conical alignment pins 18 mate with the corresponding tapered alignment holes 24 without interference. This task may additionally be automated, assuming the robot arm has a force sensor in at least the z-direction, the output of which may be monitored by the robot controller. The final orientation and position of the robot arm is saved by the robot controller as the location to attach and detach the relevant tool. Once this location is saved, the robot controller has "learned" the position of the tool, and can attach and detach the tool an unlimited number of times, without intervention and with high precision and repeatability. The method 100 is then repeated for any other tools to be attached to the robot arm.

In one embodiment, the method 100 is enabled and assisted by a software robot teaching application (also known as an "app") that guides a technician through the robot alignment and tool location teaching process. The software application may execute, for example, on a computing device. In one embodiment the computing device is a portable computing device such as a tablet computer, smartphone, or the like. The computing device is operative to communicate with the spatial orientation sensor 48, such as via a USB connection, a Bluetooth® or Wi-Fi wireless connection, or other appropriate data link. In particular, the computing device is operative to receive orientation information output by the sensor 48 and provide it as input to the robot teaching application, as well as operative to send commands from the robot teaching application to the sensor 48.

The robot teaching application may be implemented in many ways. As one illustrative example, and solely for the purpose of enabling those of skill in the art to create and deploy a suitable teaching application, the core functionality of one embodiment of such a robot teaching application is provided herein. The robot teaching application may cause the computing device to execute the following functions. At the completion of each step directing the technician to take an action, the application may pause, and may continue to the next sequential step upon an input, such as the technician pressing a button, touching an icon on a touchscreen, swiping a screen, or the like.

- Direct the technician ensure that the tool is properly disposed in a tool stand, the first alignment module 32 is attached to the master unit 12, and the second alignment module 34 is attached in a corresponding position to the tool unit 14.
- Direct the technician to attach the spatial orientation sensor assembly 44 to the second alignment module 34, and power up the spatial orientation sensor 48.
- Monitor the spatial orientation sensor 48 output (if any), and/or wait a predetermined duration sufficient for the sensor 48 to complete power-on and initiation sequences. Command the sensor 48 to "zero," or calibrate its sensors to output zero error for its current spatial orientation.
- Direct the technician to remove the spatial orientation sensor assembly 44 from the second alignment module 34 and attach it, in a corresponding position, on the first alignment module 32.
- Read the sensor 48 outputs, expressed as errors or deviations from the "zero" position of the sensor 48.
- Direct the technician to adjust the spatial orientation of the robot arm in three axes to eliminate the sensor 48 errors. This may comprise displaying the sensor 48 error outputs while the technician adjusts the orientation of the robot arm, such as by using a robot controller interface. Alternatively, the teaching program may additionally receive input from the technician and generate commands to the robot controller, and thus effectively serve as the robot controller interface.
- Direct the technician to energize one or more optical sources 36, such a cross beam laser, on the first alignment module 32.
- Direct the technician to adjust the position of the robot arm in the x- and y-axes (orthogonal to the coupling axis of the tool unit, or z-axis) until the optical indicator(s) (such as a cross line laser beam) projected onto the surface 35 of the second alignment module 34 align with the position marker(s) 38 (such as perpendicular grooves) thereon. Here again (and for subsequent steps), the teaching application may provide a user interface between the technician and the robot controller.

Direct the technician to move the robot arm along the coupling axis of the tool unit until the master unit 12 abuts the tool unit 14.

Direct the technician to indicate to the robot controller that the robot arm is in position to couple/decouple the tool. The application may optionally additionally remind the technician to power off the optical source 36 and spatial orientation sensor 48 (or may directly command the sensor 48 to power off).

Those of skill in the art will readily realize that the robot teaching application may include additional functionality, such as the ability to guide a technician to teach the robot the position of a plurality of tools, with appropriate prompts to the technician to enter tool identification information, transfer the second alignment module 34 to the next tool, and the like. The teaching application may be merely one module of a robot technician training or operating application, which includes additional, unrelated functionality. The robot teaching application is to be broadly construed.

The robot teaching application comprises instructions stored on a non-transitory machine-readable medium, such as solid-state memory (RAM, ROM, Flash, etc.), optical media (CD, DVD, etc.), magnetic media (hard disc drive, tape, etc.) or the like. The instructions are operative to be executed by a processor, Digital Signal Processor (DSP), or other instruction-processing circuit of a computing device. When executed by the computing device, the instructions are operative, in one embodiment, to cause the computing device to perform the steps described above.

The alignment modules 32, 34 and method 100 of the present invention exhibit numerous advantages over prior art alignment equipment and techniques. The spatial orientation sensor 48 enables precise orientation of the robot arm to match the orientation of the tool, without any reliance on human visual interpretation. The optical indicator—particularly in the embodiment of a cross line laser beam—facilitates rapid, precise alignment. Operator input is necessary to move the robot arm in only two directions, and it is immediately apparent when precise alignment has been achieved. The alignment modules 32, 34 may be attached to an arbitrarily large tool changer 10, and the alignment procedure is irrespective of the number of coupling mechanisms employed. The final orientation and position of the robot arm may be immediately saved as the tool location, without the need for any z-axis adjustment to account for training aid plate thickness. Since the alignment modules 32, 34 are only required to train the robot controller as to the location of tools at the beginning of each set of tasks (e.g. each production run), a manufacturer need only purchase a limited number of alignment modules. Indeed, application engineers may carry a set of alignment modules 32, 34 to a site to set up one or more robots for a production run, removing the modules when the robot controller is trained as to the location of all tools to be utilized.

As used herein, the term "spatial orientation," or simply "orientation" means the relative position of an object in 3-dimensional space with respect to three orthogonal axes, and without reference to any fixed or known location. For example, in avionics, the spatial orientation of an aircraft is referred to as its attitude—that is, the degree of rotation about any of roll, pitch, or yaw axes as referenced to the aircraft itself, and without regard to the aircraft's location or altitude. The selection of the three axes is not critical to the inventive method. The axes may be selected with reference to the spatial orientation sensor 48. Alternatively, the axes may be absolute references, such as horizontal, vertical, and an arbitrarily defined orthogonal direction. Since the inventive method comprises moving the robot arm to eliminate deviations from a sensed (and stored) orientation, the axes should be irrelevant; however, they may be mathematically translated to any 3-dimensional reference system, as desired or required.

As used herein, the "position" of an object refers to its absolute location in 3-dimensional space with reference to a known point, line, or plane. An object may change its position without changing its spatial orientation. Returning to the aviation example, the position of an aircraft is its location over the earth (e.g., in longitude and latitude) and its altitude.

As used herein, "aligning" or "positioning" an object refers to changing the position, but not the spatial orientation, of the object. In particular, after establishing the spatial orientation of a robot arm to match that of a robotic tool, the robot arm is positioned to center it with respect to the robotic tool—in other words, it is aligned with a coupling axis centered on the robotic tool. Positioning may also refer to moving the robotic arm along the coupling axis until it abuts the tool. During positioning or alignment, the spatial orientation of the robot arm is not changed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of aligning a robot arm with a robotic tool, wherein a master unit of a tool changer is affixed to the robot arm and a tool unit of the tool changer is affixed to the robotic tool, comprising:
    sensing a spatial orientation of the tool unit along three orthogonal axes;
    adjusting an orientation of the robot arm to align the master unit to the sensed spatial orientation of the tool unit with respect to the three orthogonal axes;
    projecting one or more optical indicators from one of the master and tool units to the other; and
    adjusting a position of the robot arm in two orthogonal directions transverse to a coupling axis centered on the tool unit, in response to the one or more optical indicators, so as to center the master unit on the coupling axis; and
    moving the robot arm along the coupling axis until the master unit contacts the tool unit.

2. The method of claim 1 wherein sensing the spatial orientation of the tool unit along three orthogonal axes and adjusting a position of the robot arm to align the master unit to the sensed spatial orientation of the tool unit with respect to the three axes comprise:
    affixing an Inertial Measurement Unit (IMU) to the tool unit in a predetermined orientation;
    using the IMU to sense the spatial orientation of the tool unit along three orthogonal axes;
    transferring the IMU to the master unit in the same predetermined orientation;
    reading error signals from the IMU indicating deviations from the sensed spatial orientation; and
    adjusting the orientation of the robot arm to align the master unit to the sensed spatial orientation of the tool unit with respect to the three axes.

3. The method of claim 1 wherein projecting the one or more optical indicators from one of the master and tool units to the other and adjusting the position of the robot arm in response to the optical indicators comprises projecting a laser beam from a predetermined position on one unit, and adjusting the position of the robot arm to align an incident beam with position markers on the other unit.

4. The method of claim 3 wherein the laser beam is a cross line laser beam projecting two orthogonal lines, and wherein the position markers comprise orthogonal line markers.

5. The method of claim 1 wherein adjusting the position of the robot arm in the two orthogonal directions in response to the optical indicators comprises moving the robot arm until one or more optical sensors indicates an incident optical indicator.

6. The method of claim 2 wherein the IMU is part of an Attitude and Heading Reference System (AHRS).

7. A robotic tool changer, comprising:
   a master unit operative to be affixed to one of a robot arm and a robotic tool;
   a tool unit operative to be affixed to the other of the robot arm and the robotic tool;
   a first alignment module affixed to a ledge of one of the master and tool units, the first alignment module including an optical source;
   a second alignment module affixed to a corresponding ledge of the other of the master and tool units, the second alignment module including one or more optical targets on a surface facing the first alignment module; and
   a spatial orientation sensor operative to be attached to corresponding surfaces of the first or second alignment modules, the spatial orientation sensor operative to sense a spatial orientation, along three orthogonal axes, of the alignment module to which it is attached.

8. The robotic tool changer of claim 7 wherein one of the spatial orientation sensor and the alignment module surfaces include protrusions and the other of the sensor and surfaces include corresponding holes or detents such that the sensor is aligned in a predetermined position when attached to an alignment module surface.

9. The robotic tool changer of claim 7 wherein the spatial orientation sensor is attached to the first or second alignment module surface with a hand-actuated fastener.

10. The robotic tool changer of claim 7 wherein the spatial orientation sensor comprises an Inertial Measurement Unit (IMU).

11. The robotic tool changer of claim 10 wherein the IMU comprises a wired connection to a robot control terminal.

12. The robotic tool changer of claim 10 wherein the IMU comprises a wireless interface to a robot control terminal.

13. The robotic tool changer of claim 10 wherein the IMU is operative to
   when attached to the alignment module affixed to the tool changer unit affixed to a robotic tool, zero to capture the spatial orientation of the tool unit along three orthogonal axes; and
   when attached to the alignment module affixed to the tool changer unit affixed to the robot arm, output error signals indicating deviations from the sensed spatial orientation.

14. The robotic tool changer of claim 13 wherein the IMU is further operative to output updated error signals indicating current deviations from the sensed spatial orientation, as the spatial orientation of the robot arm is adjusted in response to the error signals.

15. The robotic tool changer of claim 13 wherein the optical source is a laser.

16. The robotic tool changer of claim 15 wherein the laser outputs a cross-line beam comprising two orthogonal lines.

17. The robotic tool changer of claim 16 wherein the one or more optical targets of the second alignment module comprise two orthogonal lines.

18. The robotic tool changer of claim 10 wherein the IMU is part of an Attitude Heading Reference System (AHRS).

19. A non-transitory machine-readable medium storing instructions for assisting a user to align a robot arm with a robotic tool, said instructions operative to cause a processing circuit of a computing device to perform the steps of:
   capturing a spatial orientation of a tool unit of a tool changer along three orthogonal axes by commanding a spatial orientation sensor initially mounted on the tool unit to sense its spatial orientation; and
   directing the user to adjust an orientation of the robot arm to align a master unit to the sensed spatial orientation of the tool unit with respect to the three orthogonal axes by receiving, from the same spatial orientation sensor now mounted on the master unit of the tool changer, error signals indicative of a deviation from the spatial orientation sensed along each axis when the spatial orientation sensor was mounted on the tool unit;
   outputting the indications to the user; and
   in response to the user adjusting the orientation of the robot arm, monitoring outputs of the spatial orientation sensor and indicating to the user when the spatial orientation of the master unit deviates from the sensed spatial orientation of the tool unit by less than a predetermined amount.

20. The medium of claim 19 wherein the instructions are further operative to perform the steps of:
   prior to capturing the spatial orientation of the tool unit, directing the user to attach the spatial orientation sensor to the tool unit; and
   prior to receiving outputs from the spatial orientation sensor, directing the user to attach the spatial orientation sensor to a corresponding surface of the master unit.

21. The medium of claim 19 wherein the instructions are further operative to perform the step of:
   after the outputs from the spatial orientation sensor indicate the spatial orientation of the master unit deviates from the sensed spatial orientation of the tool unit by less than the predetermined amount, directing the user to activate an optical source on the master unit and to adjust a position of the robot arm in two orthogonal directions transverse to a coupling axis centered on the tool unit, so as to align one or more optical indicators projected by the source and impinging on the tool unit to align with one or more corresponding indicators on the tool unit.

22. The medium of claim 19 wherein the instructions are further operative to perform the step of:
   after the master unit is aligned with the tool unit in two orthogonal directions transverse to a coupling axis centered on the tool unit, directing the user to move the robot arm along the coupling axis until the master unit contacts the tool unit.

* * * * *